United States Patent Office.

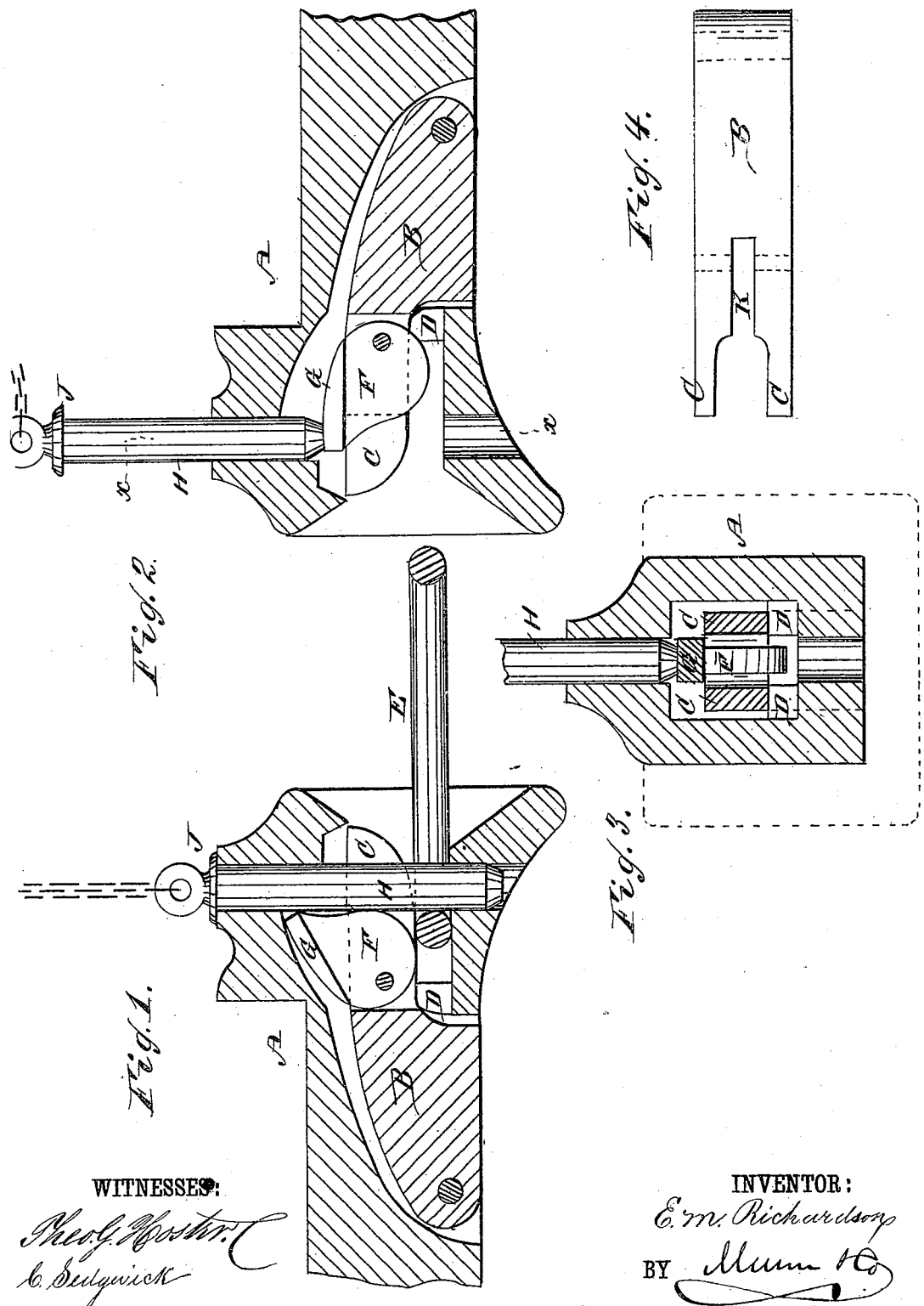

EDWARD M. RICHARDSON, OF LACONIA, NEW HAMPSHIRE, ASSIGNOR TO HIMSELF AND GEORGE L. MASON, OF SAME PLACE.

CAR-COUPLING.

SPECIFICATION forming part of Letters Patent No. 269,883, dated January 2, 1883.

Application filed May 20, 1882. (No model.)

*To all whom it may concern:*

Be it known that I, EDWARD M. RICHARDSON, of Laconia, Belknap county, New Hampshire, have invented a new and Improved Car-Coupling, of which the following is a full, clear, and exact description.

The invention consists in a draw-head in which is pivoted a block having its outer end forked, between the shanks of which fork a cam or dog is pivoted, which has its lower edge curved and its upper edge provided with side projections. The coupling-pin rests on the upper edge of the pivoted dog, and when the link enters the draw-head it raises the dog, whereby the same will be moved from under the coupling-pin, which drops and passes through the link, thus holding the same in the draw-head.

Reference is to be had to the accompanying drawings, forming part of this specification, in which similar letters of reference indicate corresponding parts in all the figures.

Figure 1 is a longitudinal sectional elevation of my improved draw-head and coupling, showing the link held therein and the pin lowered. Fig. 2 is a longitudinal sectional elevation of the same, showing the pin raised. Fig. 3 is a cross-sectional elevation of the same on the line *x x*, Fig. 2; and Fig. 4 is a plan view of the upper side of the pivoted block.

In the draw-head A a metal block, B, is pivoted at its inner end to swing in the vertical plane, which block has its outer end forked, the ends of the shanks C of the fork being beveled or rounded from the lower to the upper edges. The inner ends of the shanks of the fork rest on projections or blocks D on the bottom of the recess or opening in the draw-head. In a slot or recess, K, behind the shanks C of the forked end of the block B, a cam or dog, F, is pivoted, the curved lower edge of this dog projecting below the shanks of the forked end of the block B. The dog F is provided at its upper edge with longitudinal flanges or side projections, G, which rest on the edges of the slot or recess K. The coupling-pin H is provided at its upper end with a collar, J, or equivalent device, which prevents the link from dropping through the draw-head.

The operation is as follows: If the link E is passed into the draw-head, it is held in a horizontal position by the front end of the block B, which is directly above the inner end of the link. If the link enters a draw-head it presses against the lower curved edge of the dog F, and thereby swings the outer end of the dog F upward, which is thus moved from under the pin H, resting on it, so that this pin can drop and pass through the link E, the dog resting against the pin, as shown in Fig. 1. If the pin is raised and the link withdrawn, the dog drops; and if the pin is then released its lower end will rest on the upper edge of the dog, and will be held in a vertical position, ready for coupling, as shown in Fig. 2. The block B may be provided at its front end with a longitudinal slot, instead of being forked. The cars can thus be coupled automatically, and can be uncoupled very easily by means of chains or levers from the ends or sides of the cars. The link is held in a horizontal position when not coupled to another car by the combined weight of the block B and the dog F, so that the cars, when coupled together, will in working allow the link to move up and down without binding or bending the link.

I am aware that a draw-head has been provided with a movable block having a sliding support for the coupling-pin.

Having thus described my invention, I claim as new and desire to secure by Letters Patent—

The combination, with the draw-head, of the swinging block B, pivoted at its rear end, as shown, the swinging dog F, pivoted in the fork of said block, and provided with flanges G, projecting laterally, so as to rest on the latter and support the dog, as specified.

EDWARD M. RICHARDSON.

Witnesses:
JOHN W. ASHMAN,
JOHN F. HOYT.